(No Model.) 2 Sheets—Sheet 1.

T. B. JACKSON.
ATTACHMENT FOR BREAST STRAPS.

No. 484,433. Patented Oct. 18, 1892.

Witnesses: Inventor
T. B. Jackson (No Model.) 2 Sheets—Sheet 2.

T. B. JACKSON.
ATTACHMENT FOR BREAST STRAPS.

No. 484,433. Patented Oct. 18, 1892.

Witnesses

Inventor
Thomas B. Jackson
By Asso. Attorney
Chas. J. Stockman

UNITED STATES PATENT OFFICE.

THOMAS B. JACKSON, OF SHOUSTOWN, PENNSYLVANIA.

ATTACHMENT FOR BREAST-STRAPS.

SPECIFICATION forming part of Letters Patent No. 484,433, dated October 18, 1892.

Application filed May 19, 1891. Serial No. 393,344. (No model.)

*To all whom it may concern:*

Be it known that I, THOMAS B. JACKSON, a citizen of the United States, residing at Shoustown, in the county of Allegheny and State of Pennsylvania, have invented certain new and useful Improvements in Attachments for Breast-Straps; and I do hereby declare the following to be a full, clear, and exact description of the invention, such as will enable others skilled in the art to which it pertains to make and use the same, reference being had to the accompanying drawings, which form a part of this specification.

My invention relates to an improved attachment for harness breast-straps which will keep the breast-strap away from contact with the animal and prevent choking of the latter; and it consists in the peculiar construction and arrangement of parts, as will be fully set forth hereinafter.

Figure 1:
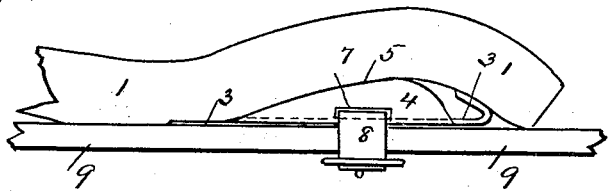
Figure 2:
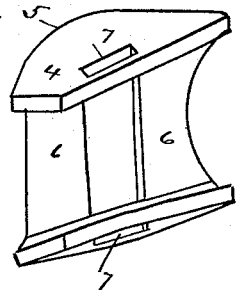
Figure 3:
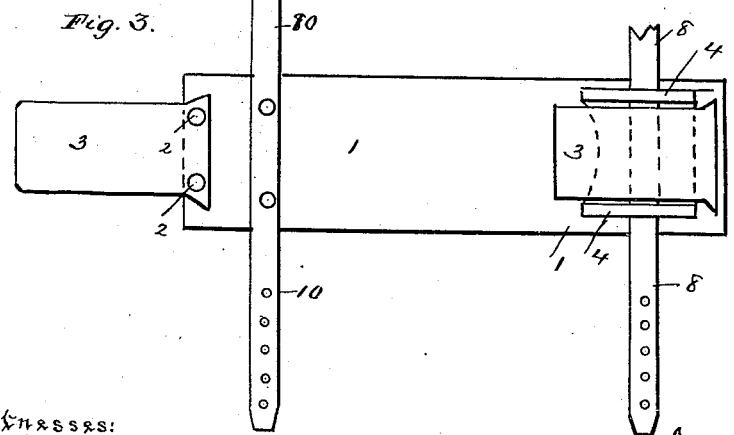
Figure 4:
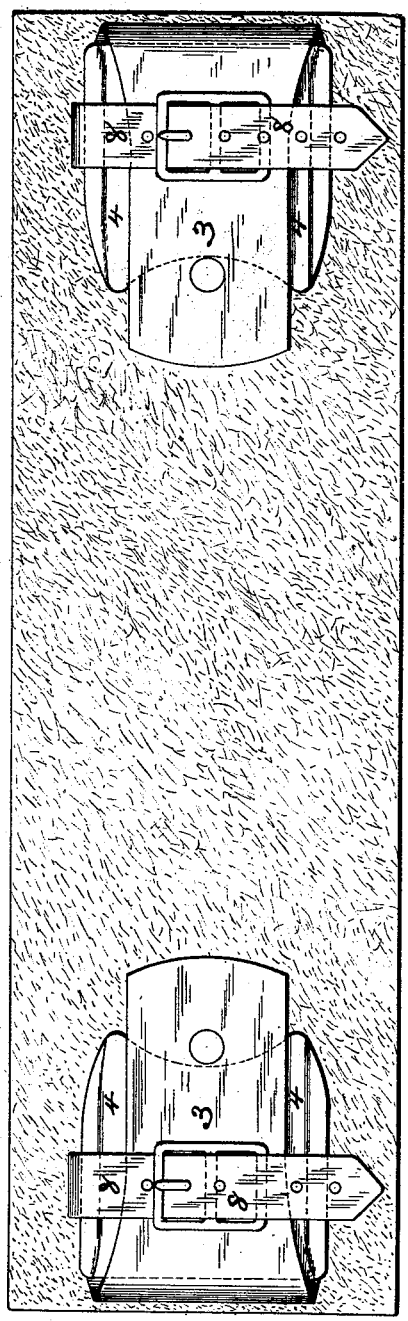

Figure 1 is a plan view of one of my improved pads attached to a portion of a breast-strap. Fig. 2 is a perspective view of one of the saddles inserted between the breast-strap and a soft-felt pad placed next the shoulders of the horse. Fig. 3 is a rear elevation of the device having one of the saddles removed therefrom, and Fig. 4 is a plan view of the entire device.

To construct an attachment for harness breast-straps in accordance with my invention, I provide a pad consisting of a thick soft piece of felt and attach thereto by means of rivets 2 two straps 3, one at each end thereof. I now provide two saddles 4, constructed from a hard unyielding material, having a rounded inner face 5 and a shallow groove 6 at its opposite side for the purpose of receiving the straps 3 above described. Formed vertically in these saddles 4 are openings 7, through which short straps 8 are passed for the purpose of securing the device to the breast-strap 9; but this opening 7 may be omitted and a short strap 10, riveted to the felt 1, used, as will be seen by reference to Fig. 3, which illustrates both ways.

To attach this device into a breast-strap of ordinary construction, I first place the saddles 4 near the ends of the felt 1 and then bend the straps 3 over into the recesses 6 and place the whole at the inner middle portion of the breast-strap 9. The short transverse straps 8 being first passed through the openings 7, the same is buckled over the breast-strap 9, as will be seen by reference to Fig. 1 on the drawings. By the use of this device the breast-strap is held away from the windpipe of the horse and will prevent choking, as the saddles are arranged on either side of the same.

Having thus described my invention, I claim—

The herein-described attachment for harness breast-straps for holding the latter away from the animal and preventing choking of the latter, comprising a pad 1 of soft material, straps 3, secured thereto and projecting beyond the ends thereof, saddles secured to said pad adjacent to the ends thereof, said saddles being made of an unyielding material and having a rounded end and a curved inner side, said saddles also having grooves to receive the ends of said straps 3, and straps 8 for securing the device to the breast-strap, all substantially as shown and described.

In testimony that I claim the foregoing I hereunto affix my signature this 9th day of February, A. D. 1891.

THOMAS B. JACKSON.

In presence of—
C. C. LEE,
M. E. HARRISON.